Nov. 7, 1939.   A. E. FADEL   2,178,785
HEATER
Original Filed Feb. 23, 1937   2 Sheets-Sheet 1

INVENTOR.
ADDIE E. FADEL
By Arthur L. Slee
HER ATTORNEY.

Nov. 7, 1939.     A. E. FADEL     2,178,785
HEATER
Original Filed Feb. 23, 1937    2 Sheets-Sheet 2
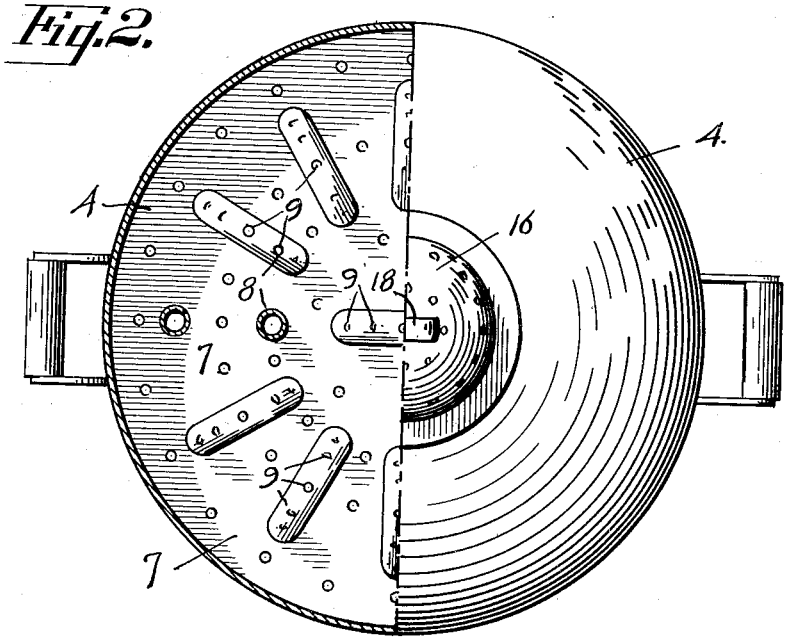
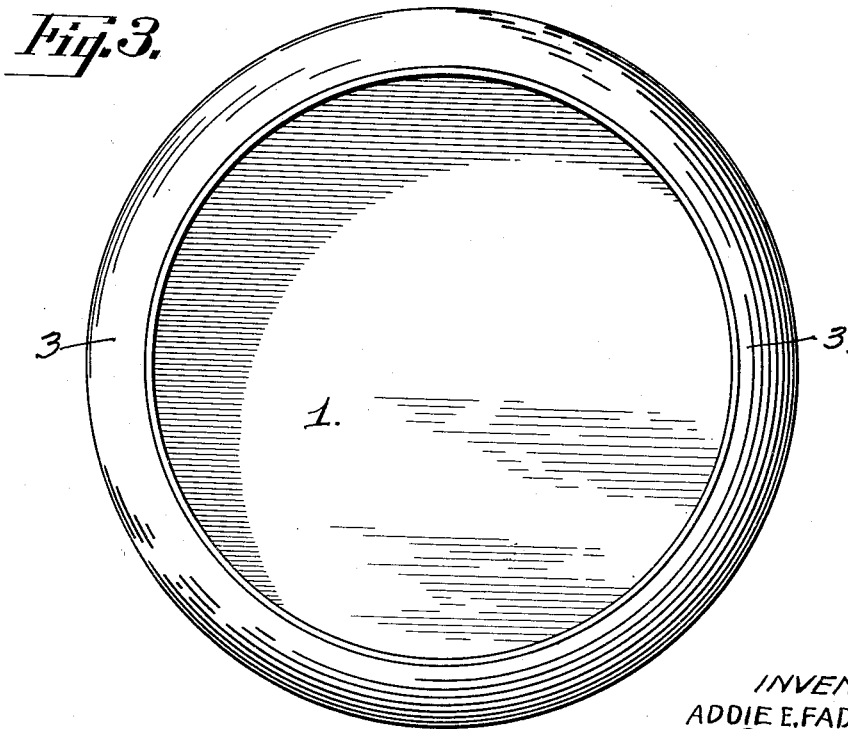
INVENTOR
ADDIE E. FADEL
BY Arthur L. Lee
HER ATTORNEY.

Patented Nov. 7, 1939

2,178,785

UNITED STATES PATENT OFFICE 2,178,785

HEATER

Addie E. Fadel, San Francisco, Calif.

Application February 23, 1937, Serial No. 127,078
Renewed March 27, 1939

1 Claim. (Cl. 219—38)

My invention relates to improvements in heaters and particularly of the portable type for use in small rooms or apartments, wherein a water compartment, which may be provided with a suitable heating element if desired, operates in conjunction with an upper steam compartment for radiating heat from said steam to heat a room.

The primary object of the present invention is to provide a new and improved heater for heating rooms and similar apartments.

Another object is to provide a steam heater which may be easily and economically produced and operated to heat a room or apartment and which may be easily transported from one room to another.

A further object of the present invention is to provide a new and improved steam heater which may be safely used without danger of explosion.

I accomplish these and other objects by means of the improved device disclosed in the drawings forming a part of the present application, and in which—

Fig. 2 is a top plan view, in which one half is also shown in horizontal section; and Fig. 3 is a top plan view of the bottom or water compartment.

Figure 1:
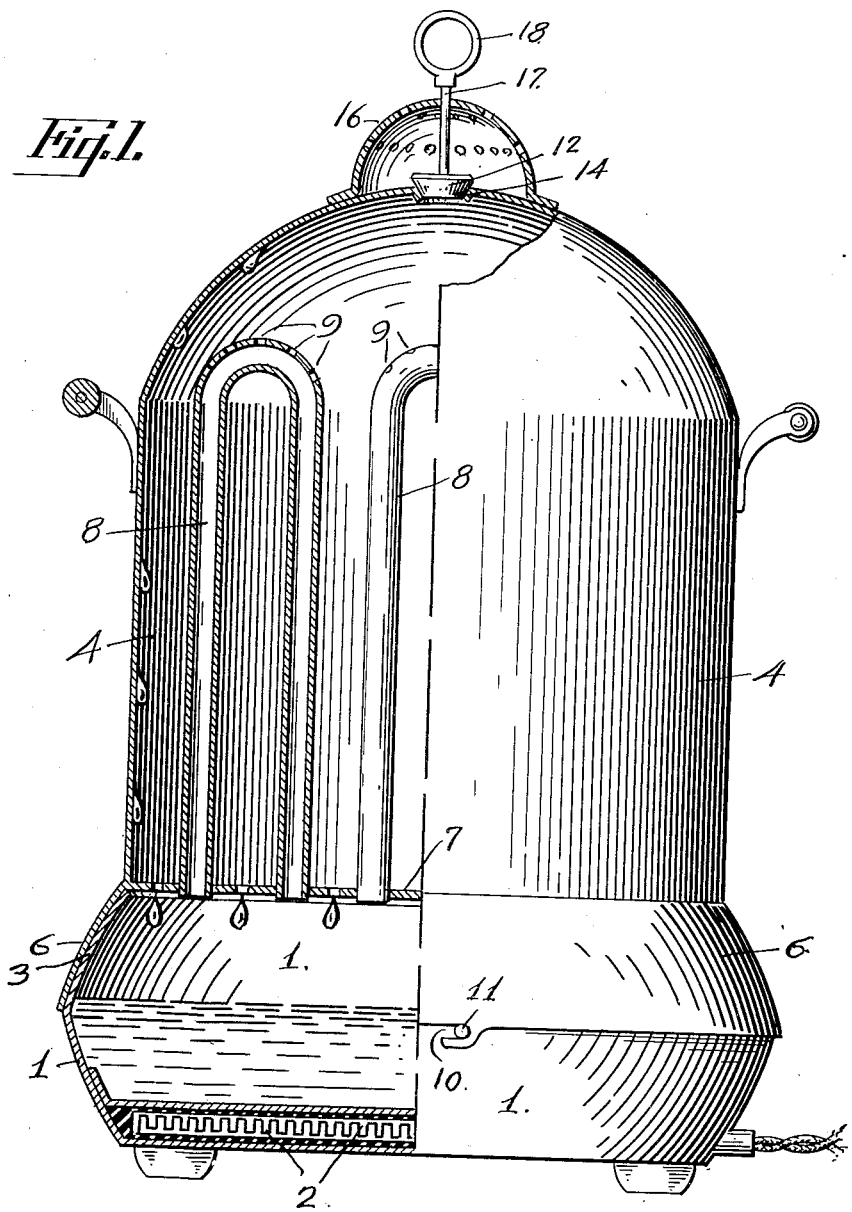
Fig. 1 is a side view of the device, one half being shown in vertical section.

Referring to the drawings:

The numeral 1 is used to designate what I term a base or lower compartment for containing water to be heated and containing, if desired, a suitable heating element diagrammatically indicated at 2 and preferably in the bottom of the base or lower water compartment 1 for water contained therein. The base or lower compartment 1 is also provided with a converging upper portion 3 and an open top.

A steam compartment 4 is provided with a depending and flaring flange 6 for engaging and seating upon the converging portion 3 of the base 1 so that steam may not normally escape from between said lower and upper compartments.

The steam compartment 4 is also provided with an apertured bottom 7 from which rise inverted U-shaped tubes 8 apertured at their tops as at 9 and having their lower open ends communicating with the water compartment 1, the purpose of which will be, hereinafter, more fully set forth.

The steam compartment 4 is detachably secured to the base 1 by means of any suitable securing device such, for instance, as a bayonet slot 10 engaging a pin 11.

A gravity operated pressure release valve 12 is seated within an opening 14 leading into an apertured dome or chamber 16 on top of the steam compartment 4. A suitable stem 17 extends upwardly from said valve 14 and projects exteriorly from the top of said dome and terminates in a ring 18 or other device by means of which said valve may be lifted.

In operation:

A sufficient quantity of water is placed within the base 1 or water compartment and heated by the heating element 2 contained therein, or by placing said base over a gas plate or any suitable source of heat.

When the water is heated to a suitable temperature the steam arising therefrom enters the lower open ends of the inverted U-shaped tubes 8 and, after passing through said tubes, emerges through the apertures 9 in the upper ends thereof and into the steam compartment 4 thereby heating said compartment. Heat radiating from the outer surface of the walls of said compartment is used to heat the room or apartment within which the heater is located.

As the steam contacts the walls of said compartment it is condensed and the water therefrom is drained through the apertured bottom 7 of said steam compartment and back into the water compartment or base 1. Any excess steam pressure within the steam compartment 4 will unseat the valve 12 and permit the passage of such excess pressure through the opening 14 and into the dome 16 and through the apertures thereof into the atmosphere and evaporated.

Should the temperature of the device become greater than required it may be easily lowered by raising the valve 12 by means of the ring 18 and stem 17 thereof, thereby permitting the escape of steam into the atmosphere where the heat therefrom will be dissipated into the atmosphere.

A new supply of water may be easily obtained, when required, by releasing the pin 11 from the slot 10, when the steam compartment 4 may be separated and removed from the base or water compartment 1, thereby rendering the interior of said compartment 1 readily accessible through the open top thereof. The weight of the steam compartment may be made sufficient to provide an effective seat between the flange 6 of the steam compartment 4 and the converging top 3 of the water compartment or base 1, so that there will be no appreciable escape of steam from between said base and steam compartment when the device is in operation.

Having described my invention, I claim—

A heater comprising a lower water compartment having an open top with a converging upper end; a heating element mounted within said water compartment for heating water therein; and a steam compartment having a closed top and a flaring flange for seating on the converging top of the water compartment and also having an apertured bottom for draining water from steam condensed in said steam compartment into said water compartment.

ADDIE E. FADEL.